United States Patent
Takahashi et al.

(10) Patent No.: US 11,318,923 B2
(45) Date of Patent: May 3, 2022

(54) SOLENOID VALVE, VEHICLE BRAKE HYDRAULIC PRESSURE CONTROL APPARATUS AND SOLENOID VALVE FABRICATION METHOD

(71) Applicant: AUTOLIV NISSIN BRAKE SYSTEMS JAPAN CO., LTD., Ueda (JP)

(72) Inventors: Hirokazu Takahashi, Nagano (JP); Hiroaki Tokoi, Nagano (JP)

(73) Assignee: AUTOLIV NISSIN BRAKE SYSTEMS JAPAN CO., LTD., Nagano (JP)

(*) Notice: Subject to any disclaimer, the term of this patent is extended or adjusted under 35 U.S.C. 154(b) by 801 days.

(21) Appl. No.: 15/471,195

(22) Filed: Mar. 28, 2017

(65) Prior Publication Data

US 2017/0282882 A1 Oct. 5, 2017

(30) Foreign Application Priority Data

Mar. 30, 2016 (JP) .............................. JP2016-069770
Mar. 30, 2016 (JP) .............................. JP2016-069771

(51) Int. Cl.
*B60T 15/00* (2006.01)
*F16K 31/06* (2006.01)
(Continued)

(52) U.S. Cl.
CPC ............ *B60T 15/00* (2013.01); *B60T 8/3635* (2013.01); *B60T 13/58* (2013.01); *B60T 13/686* (2013.01);
(Continued)

(58) Field of Classification Search
CPC ................ B60T 13/686; B60T 13/683; B60T 2270/402; B60T 11/224; B60T 8/3655;
(Continued)

(56) References Cited

U.S. PATENT DOCUMENTS 4,844,122 A * 7/1989 Ichihashi ............ F16K 31/0606
  137/625.27
5,184,773 A * 2/1993 Everingham ...... B60H 1/00485
  137/115.25
(Continued)

FOREIGN PATENT DOCUMENTS

DE   102013222653   5/2015
JP     2004011454   1/2004
(Continued)

OTHER PUBLICATIONS

European Search Report for EP Application No. 17163547.7-1762 dated Aug. 2, 2017, 9 pages.
(Continued)

*Primary Examiner* — Robert A. Siconolfi
*Assistant Examiner* — Mahbubur Rashid
(74) *Attorney, Agent, or Firm* — Andrew M. Calderon; Roberts Calderon Safran & Cole, P.C.

(57) ABSTRACT

One embodiment provides a solenoid valve. The solenoid valve includes a fixed core, a movable core and a coil. A first valve seat member and a second valve seat member are fixed in the fixed core, and a valve body member is disposed therebetween. A spring member is interposed between the valve body member and the second valve seat member such that the valve body member is normally seated on the first valve seat member. The valve body member can move away from the first valve seat member to be seated on the second valve seat member, by being pushed by the movable core. And, a guide member holds the valve body member and the spring member to the second valve seat member so as not to move away from the second valve seat member.

22 Claims, 7 Drawing Sheets

(51) Int. Cl.
*B60T 8/36* (2006.01)
*B60T 13/58* (2006.01)
*B60T 13/68* (2006.01)
*F16K 11/044* (2006.01)
*B60T 8/40* (2006.01)

(52) U.S. Cl.
CPC ........ *F16K 11/044* (2013.01); *F16K 31/0627* (2013.01); *B60T 8/4081* (2013.01); *B60T 2270/402* (2013.01); *B60T 2270/404* (2013.01); *B60T 2270/414* (2013.01)

(58) Field of Classification Search
CPC ...... B60T 8/367; B60T 15/027; B60T 8/3665; B60T 13/68; B60T 15/00; F16K 31/082; F16K 31/06; F16K 31/0675; F16K 31/084; F16K 27/029; F16K 31/0627; F16K 11/044; F16K 1/36
USPC ........................................... 303/1.25
See application file for complete search history.

(56) References Cited

U.S. PATENT DOCUMENTS

| | | | | |
|---|---|---|---|---|
| 5,203,617 A * | 4/1993 | Wilde | B60T 8/365 | 137/110 |
| 5,218,999 A * | 6/1993 | Tanimoto | F16K 31/0627 | 137/625.65 |
| 5,336,211 A * | 8/1994 | Metz | A61F 5/453 | 128/844 |
| 5,810,330 A * | 9/1998 | Eith | B60T 8/363 | 137/630 |
| 5,860,709 A * | 1/1999 | Hosoya | B60T 8/4872 | 303/116.1 |
| 6,213,570 B1 * | 4/2001 | Gegalski | B60T 8/363 | 303/119.2 |
| 6,224,170 B1 * | 5/2001 | Hosoya | B60T 8/363 | 251/129.15 |
| 6,254,200 B1 * | 7/2001 | Ganzel | B60T 8/363 | 303/113.1 |
| 6,435,210 B1 * | 8/2002 | Obersteiner | B60T 8/34 | 137/599.18 |
| 6,481,452 B2 * | 11/2002 | Reuter | B60T 8/363 | 137/14 |
| 6,508,521 B2 * | 1/2003 | Gegalski | B60T 8/363 | 303/139 |
| 6,662,581 B2 * | 12/2003 | Hirota | F04B 27/1804 | 417/222.2 |
| 6,755,390 B2 * | 6/2004 | Masuda | B60T 8/363 | 251/129.15 |
| 6,804,970 B2 * | 10/2004 | Saeki | B60H 1/3216 | 62/133 |
| 7,018,179 B2 * | 3/2006 | Hirota | F04B 27/1804 | 417/222.2 |
| 7,121,811 B2 * | 10/2006 | Hirota | F04B 27/1804 | 417/222.2 |
| 7,644,729 B2 * | 1/2010 | Cho | F04B 27/1804 | 137/625.27 |
| 7,866,625 B2 * | 1/2011 | Lee | B60T 8/363 | 251/129.15 |
| 8,348,230 B2 * | 1/2013 | Michl | B60T 8/363 | 251/129.07 |
| 9,038,984 B2 * | 5/2015 | Voss | B60T 8/363 | 303/119.2 |
| 10,197,186 B2 * | 2/2019 | Dinerman | A61F 5/453 | 128/844 |
| 2003/0213928 A1 * | 11/2003 | Masuda | B60T 8/363 | 251/129.15 |
| 2003/0223884 A1 | 12/2003 | Hirota | | |
| 2004/0251441 A1 * | 12/2004 | Schmitt | B60T 8/34 | 251/129.07 |
| 2008/0148686 A1 * | 6/2008 | Voss | F16K 27/041 | 53/281 |
| 2008/0191156 A1 * | 8/2008 | Shigeta | B60T 8/363 | 251/129.02 |
| 2008/0237524 A1 * | 10/2008 | Lee | B60T 8/363 | 251/324 |
| 2009/0038697 A1 * | 2/2009 | Cho | F25B 41/04 | 137/625.48 |
| 2009/0095928 A1 * | 4/2009 | Lee | B60H 1/3216 | 62/133 |
| 2010/0213758 A1 * | 8/2010 | Nanahara | B60T 8/363 | 303/20 |
| 2012/0248354 A1 * | 10/2012 | Takamatsu | B60T 8/367 | 251/129.02 |
| 2012/0326065 A1 * | 12/2012 | Ferguson | B60T 8/363 | 251/129.15 |
| 2014/0217809 A1 * | 8/2014 | Koyama | B60T 13/146 | 303/6.01 |
| 2015/0102243 A1 * | 4/2015 | Timmermans | F16K 27/029 | 251/129.07 |
| 2015/0274144 A1 * | 10/2015 | Tokoi | B60T 8/365 | 137/110 |
| 2016/0207512 A1 * | 7/2016 | Komaba | B60T 7/042 | |

FOREIGN PATENT DOCUMENTS

| | | |
|---|---|---|
| JP | 2012149594 | 8/2012 |
| WO | 2015046308 | 4/2015 |

OTHER PUBLICATIONS

Japanese Office Action in related JP Application No. 2016-069771 dated Aug. 27, 2019, 6 pages.
Japanese Office Action in related JP Application No. 2016-069770 dated Sep. 24, 2019, 8 pages.

\* cited by examiner

SOLENOID VALVE, VEHICLE BRAKE HYDRAULIC PRESSURE CONTROL APPARATUS AND SOLENOID VALVE FABRICATION METHOD

CROSS-REFERENCE TO RELATED APPLICATION(S)

This application claims priorities from Japanese Patent Applications No. 2016-069770 filed on Mar. 30, 2016, and No. 2016-069771 filed on Mar. 30, 2016, the entire contents of which are incorporated herein by reference.

FIELD

The present invention relates to a solenoid valve, a vehicle brake hydraulic pressure control apparatus and a solenoid valve fabrication method.

BACKGROUND

As a solenoid valve used in a vehicle brake hydraulic pressure control apparatus, there is a two-position, three-way valve which includes a first valve seat member and a second valve seat member which are fixed inside a fixed core, and a spherical valve body member which is disposed between the first valve seat member and the second valve seat member (for example, refer to WO-2015-046308-A).

In the conventional solenoid valve described above, the valve body member is held on to a retainer which is placed on an end portion of the first valve seat member, and a spring member (a coil spring) is interposed between the retainer and the second valve seat member. Then, the retainer is pressed against the first valve seat member by a biasing force of the spring member, whereby the valve body member is seated on a valve seat surface of the first valve member.

In the conventional solenoid valve described above, a movable core is moved by an electromagnetic force, so that the retainer is pushed out by the movable core, whereby the valve body member is moved away from the valve seat surface of the first valve seat member, so that the valve body member is seated on a valve seat surface of the second valve seat member.

In fabricating the conventional solenoid valve described above, an opening portion of the fixed core is disposed upwards, and the first valve seat member, the valve body member, the retainer and the spring member are sequentially built into an interior of the fixed core. When the parts described above are built into the interior of the fixed core, the spring member is provided on an upper surface of the first valve seat member so as to be erected therefrom in the interior of the fixed core.

Thereafter, the second valve seat member is press fitted in the interior of the fixed core, and a lower end portion of the second valve seat member is inserted into an upper end portion of the spring member. As this occurs, the upper end portion of the spring member is unstable, which makes it difficult for the second valve seat member to be built in the interior of the fixed core. This makes the fabrication of the solenoid valve difficult, leading to a problem that the productivity of such solenoid valves is deteriorated.

In addition, in the conventional solenoid valve described above, the valve seat surfaces of the first valve seat member and the second valve seat member and flow paths are formed so as to match a spherical surface of the valve body member, leading to a problem that a limitation is imposed on the shapes of the two valve seat members.

SUMMARY

One object of the invention is to provide a solenoid valve which can improve the building properties of parts involved, a vehicle brake hydraulic pressure control apparatus which uses the solenoid valve and a solenoid valve fabrication method.

A first aspect of the invention provides,
a solenoid valve including:
a fixed core in which a flow path is formed;
a movable core which is provided movably in relation to the fixed core;
a coil configured to move the movable core by an electromagnetic force;
a first valve seat member and a second valve seat member which are fixed in the fixed core;
a valve body member which is disposed between the first valve seat member and the second valve seat member; and
a spring member which is interposed between the valve body member and the second valve seat member,
wherein the valve body member is seated on a valve seat surface of the first valve seat member by a biasing force of the spring member,
wherein, as a result of the valve body member being pushed out by the movable core, the valve body member is caused to move away from the first valve seat member and to be seated on a valve seat surface of the second valve seat member, and
wherein the valve body member and the spring member are held to the second valve seat member by a guide member which restricts the valve body member from moving away from the second valve seat member.

According to the above-mentioned solenoid valve, the valve body member, the spring member, the guide member and the second valve seat member can be brought into the single integral unit. According to the above-mentioned feature, in fabricating the solenoid valve, the valve body member, the spring member, the guide member and the second valve seat member can be built in the fixed core as the single unit. Thus, the building properties of the parts involved can be improved and hence, the productivity of the solenoid valve can be improved.

There may be provided,
the solenoid valve,
wherein a guide surface on which the valve body member can slide is formed on the guide member.

According to the above-mentioned feature, the valve body member can be moved stably.

There may be provided,
the solenoid valve,
wherein the valve body member includes:
a spring bearing portion on which an end portion of the spring member is fitted;
a sliding surface which can slide on the guide member; and
an engagement portion which is brought into engagement with the guide member.

According to the above-mentioned feature, the spring member and the guide member can easily be built on the valve body member.

There may be provided,
the solenoid valve,
wherein the valve body member includes:
a first valve portion which is seated on the valve seat surface of the first valve seat member; and
a second valve portion which is seated on the valve seat surface of the second valve seat member, wherein an area where the first valve portion is brought into abutment with the valve seat surface of the first valve seat member is greater than an area where the second valve portion is brought into abutment with the valve seat surface of the second valve seat member.

According to the above-mentioned feature, since the two valve portions are formed on the single valve body member, the areas where the valve portions are brought into abutment with the valve seat surfaces of the corresponding valve seat members can be set individually for the valve portions. Namely, the areas where the valve portions are brought into abutment with the valve seat surfaces when the valve portions are brought into abutment with the valve seat surfaces of the corresponding valve seat members can be set independently for each of the valve portions. Thus, in the configuration described above, the sealing performance of the first valve portion against the first valve seat member can be enhanced while increasing the flow rate of fluid which passes the first valve seat member.

There may be provided,
the solenoid valve, further including
a movable rod which moves in association with the movable core,
wherein a flat surface is formed on the first valve portion, and
wherein an end face of the movable rod is brought into abutment with the flat surface.

According to the above-mentioned feature, the movable rod can be brought into abutment with the first valve portion in a stable fashion. Since it becomes difficult for the movable rod to wear by bringing the movable rod into surface contact with the first valve portion, the degree of freedom in selecting materials for the movable rod can be enhanced.

There may be provided,
the solenoid valve,
wherein the valve body member includes:
a main body portion;
the first valve portion which is formed at one end of the main body portion; and
the second valve portion which is provided at the other end of the main body portion so as to project therefrom, and
wherein a part of a spherical surface is formed at a distal end portion of the second valve portion.

According to the above-mentioned feature, the second valve portion can be seated stably on the valve seat surface of the second valve seat member.

There may be provided,
the solenoid valve,
wherein the guide member has a cylindrical shape,
wherein the spring member is accommodated in the guide member, and
wherein a part of the flow path is formed between an inner circumferential surface of the fixed core and an outer circumferential surface of the guide member.

According to the above-mentioned feature, since it is possible to prevent a great flow rate of fluid from striking the spring member by causing the fluid to flow in the flow path on the outer side of the guide member, the degree of freedom in designing the spring member can be enhanced.

For example, in the event that the biasing force of the spring member is suppressed, the electric power that the coil needs to move the movable core against the biasing force of the spring member can be reduced.

There may be provided,
a vehicle brake hydraulic pressure control apparatus disposed between a master cylinder and a wheel cylinder, including:
a slave cylinder configured to generate a brake hydraulic pressure by driving an electric actuator; and
the above-mentioned solenoid valve,
wherein the solenoid valve switches between:
a state where the valve body member is seated on the valve seat surface of the first valve seat member to thereby establish a communication between the master cylinder and the wheel cylinder; and
a state where the valve body member is seated on the valve seat surface of the second valve seat member to thereby establish a communication between the slave cylinder and the wheel cylinder.

According to the above-mentioned vehicle brake hydraulic pressure control apparatus, since the above-mention solenoid valve is used, the productivity of the vehicle brake hydraulic pressure control apparatus can be improved.

In addition, according to the above-mentioned vehicle brake hydraulic pressure control apparatus, since not only can the solenoid valve be opened and closed in a stable fashion but also the flow rate of brake fluid which passes the solenoid valve can be ensured sufficiently, the brakes of the vehicle can be controlled well.

There may be provided,
a fabrication method for the above-mentioned solenoid valve, including:
fixing the first valve seat member in the fixed core; and
in such a state that the valve body member and the spring member are held to the second valve seat member by the guide member, fixing the second valve seat member in the fixed core and causing the valve body member to be seated on the valve seat surface of the first valve seat member.

According to the above-mentioned fabrication method, since the valve body member, the spring member, the guide member and the second valve seat member are built in the fixed core as the single unit, the productivity of the solenoid valve can be improved.

According to the first aspect of the invention, since the valve body member, the spring member, the guide member and the second valve seat member are configured as the integral unit, the building properties of the parts involved can be improved, and hence, the productivity of the solenoid valve can be improved.

With the above-mentioned solenoid valve, since the degree of freedom in designing the shapes of the valve seat surface and the flow path of the valve seat member can be enhanced, the valve seat member can easily be configured so as to comply with the specification of the solenoid valve.

With the above-mentioned vehicle brake hydraulic pressure control apparatus, not only can the productivity of the vehicle brake hydraulic pressure control apparatus be improved, but also the brakes of the vehicle can be controlled well.

With the above-mentioned solenoid valve fabrication method, since the valve body member, the spring member, the guide member and the second valve seat member are built in the fixed core as the single unit, the productivity of the solenoid valve can be improved.

Another object of the invention to solve is to provide a solenoid valve which can enhance the degree of freedom in designing a shape of a valve seat member and a vehicle brake hydraulic pressure control apparatus which utilizes the solenoid valve.

A second aspect of the invention provides
a solenoid valve including:
a fixed core in which a flow path is formed;
a movable core which is provided movably in relation to the fixed core;
a coil configured to move the movable core by an electromagnetic force;
a first valve seat member and a second valve seat member which are fixed in the fixed core;
a valve body member which is disposed between the first valve seat member and the second valve seat member; and
a spring member which is interposed between the valve body member and the second valve seat member,
wherein the valve body member includes:
a main body portion;
a first valve portion which is provided at one end face of the main body portion so as to project therefrom; and
a second valve portion which is provided at the other end face of the main body portion so as to project therefrom,
wherein the first valve portion is seated on a valve seat surface of the first valve seat member by a biasing force of the spring member,
wherein, as a result of the valve body member being pushed out by the movable core, the first valve portion is caused to move away from the first valve seat member, and the second valve portion is then seated on a valve seat surface of the second valve seat member, and
wherein a seal diameter of the first valve portion and a seal diameter of the second valve portion differ from each other.

The seal diameters of the valve portions mean an outside diameter of an area where the valve portion is in contact with the valve seat surface when the valve portion is seated on the valve seat surface of the valve portion.

According to the above-mentioned solenoid valve, since the two valve portions are formed on the single valve body member, the shapes of the two valve portions can be formed independently of each other. According to the above-mentioned feature, the degree of freedom in designing the shapes of the valve seat members can be enhanced. Thus, in the event that the seal outside diameter of the first valve portion is greater than the seal outside diameter of the second valve portion, an open angle of the valve seat surface of the first valve seat member can be made greater, and hence, the first valve portion can be seated stably on the first valve seat member Since an axial cross section of the flow path in the first valve seat member can be made great by setting the seal diameter of the first valve portion great, the flow rate of fluid which passes the first valve seat member can be increased.

There may be provided
the solenoid valve,
wherein a sliding surface which can slide on a guide surface formed in the fixed core is formed on an outer circumferential surface of the main body portion.

According to the above-mentioned feature, the valve body member can be moved stably.

There may be provided
the solenoid valve,
wherein the valve body member and the spring member are held to the second valve seat member by a guide member.

The valve body member, the spring member, the guide member and the second valve seat member may be made into an integral unit.

According to the above-mentioned feature, in fabricating the solenoid valve, the valve body member, the spring member, the guide member and the second valve seat member can be built in the fixed core as the single unit. Thus, with the above-mentioned solenoid valve, the building properties of the parts involved can be improved, and hence, the productivity of the solenoid valve can be improved.

There may be provided
the solenoid valve,
wherein a guide surface on which the sliding surface of the main body portion can slide is formed on the guide member.

According to the above-mentioned feature, the valve body member can be moved stably.

There may be provided
the solenoid valve,
wherein the valve body member includes:
a spring bearing portion on which an end portion of the spring member is fitted; and
an engagement portion which is brought into engagement with the guide member.

According to the above-mentioned feature, the spring member and the guide member can easily be built on the valve body member.

There may be provided
the solenoid valve, further including:
a movable rod which moves in association with the movable core,
wherein a flat surface is formed on the first valve portion, and
wherein an end face of the movable rod is brought into abutment with the flat surface.

According to the above-mentioned feature, the movable rod can be brought into abutment with the first valve portion in a stable fashion.

By bringing the movable rod into surface contact with the first valve portion, it becomes difficult for the movable rod to wear, and therefore, the degree of freedom in selecting materials for the movable rod can be enhanced.

There may be provided
a vehicle brake hydraulic pressure control apparatus which is disposed between a master cylinder and a wheel cylinder, including:
a slave cylinder configured to generate a brake hydraulic pressure by driving an electric actuator; and
the above-mentioned solenoid valve,
wherein the solenoid valve switches between:
a state where the valve body member is seated on the valve seat surface of the first valve seat member to thereby establish a communication between the master cylinder and the wheel cylinder; and
a state where the valve body member is seated on the valve seat surface of the second valve seat member to thereby establish a communication between the slave cylinder and the wheel cylinder.

According to the above-mentioned vehicle brake hydraulic pressure control apparatus, since the above-mentioned solenoid valve is used therein, the solenoid valve can be opened and closed stably.

Since the flow rate of brake fluid which passes the solenoid valve can be ensured sufficiently, the brakes of the vehicle can be controlled well.

There may be provided
the vehicle brake hydraulic pressure control apparatus,
wherein the seal diameter of the first valve portion is greater than the seal diameter of the second valve portion.

According to the above-mentioned feature, the axial cross section of the flow path in the first valve seat member can be made great. Namely, the axial cross section of the flow path in the first valve seat member which communicates with the slave cylinder and the wheel cylinder can be made great, thereby making it possible to increase the flow rate of brake fluid which passes the first valve seat member.

By making the seal diameter of the first valve portion so greater, the sealing performance of the first valve portion against the first valve seat member can be enhanced while increasing the flow rate of brake fluid which passes the first valve seat member.

By making the seal diameter of the first valve portion so greater, an open angle of the valve seat surface of the first valve seat member can be made great. As a result, the first valve portion can be seated stably on the valve seat surface of the first valve seat member, so that the communication between the slave cylinder and the wheel cylinder can be cut off.

According to the above-mentioned solenoid valve, the shapes of the two valve portions can be formed independently of each other, and the degree of freedom in designing the shape of the valve seat member can be enhanced. Therefore, the valve seat member can easily be configured so as to comply with the specification of the solenoid valve.

With the above-mentioned vehicle brake hydraulic pressure control apparatus, the brakes of the vehicle can be controlled well.

DETAILED DESCRIPTION

Figure 1:
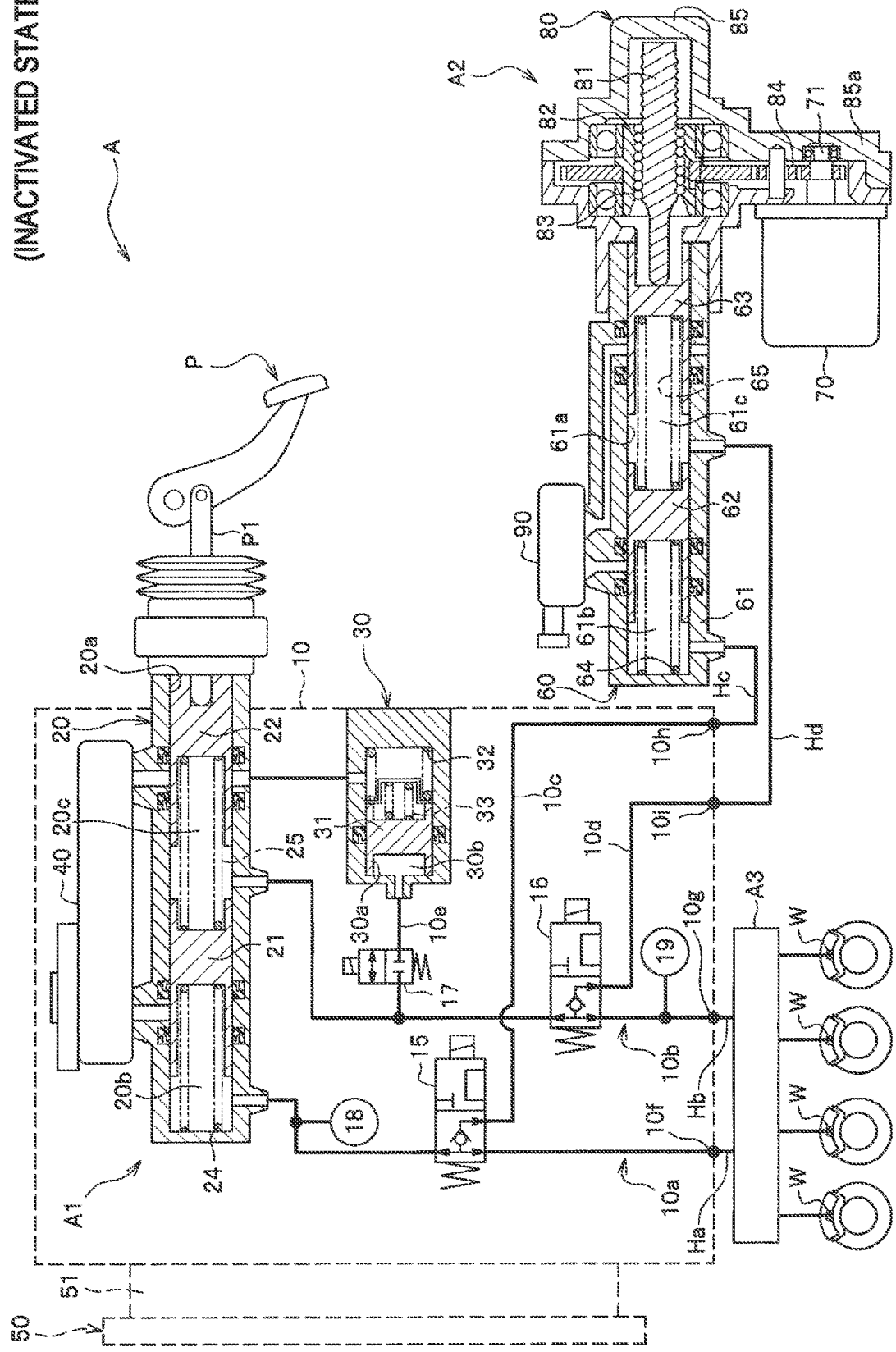
FIG. 1 is a schematic diagram showing a vehicle brake hydraulic pressure control apparatus according to an embodiment, which is inactive.

Referring to the drawings as required, an embodiment will be described in detail.

As shown in FIG. 1, a vehicle brake hydraulic pressure control apparatus A of the embodiment includes both a brake-by-wire type brake system which is activated to operate when a prime mover (an engine or an electric motor) is activated and a hydraulic brake system which is activated to operate for emergency or when the engine is stopped.

The vehicle brake hydraulic pressure control apparatus A includes a hydraulic pressure generation unit A1 which generates a hydraulic pressure by a pedal effort exerted on a brake pedal P (a brake operator), a motor cylinder unit A2 which generates a brake hydraulic pressure by making use of a motor 70, and a hydraulic pressure control unit A3 which assists in stabilizing the behaviors of a vehicle.

The hydraulic pressure generation unit A1, the motor cylinder unit A2 and the hydraulic pressure control unit A3 are configured as separate units and are connected together through external piping for communication.

The vehicle brake hydraulic pressure control apparatus A can be installed not only on a hybrid electric vehicle which utilizes both an engine (an internal combustion engine) and a motor and an electric vehicle and a fuel cell vehicle which rely only on a motor as a drive source but also on a motor vehicle which utilizes only an engine as a drive source.

The hydraulic pressure generation unit A1 includes a base body 10, a tandem-type master cylinder 20, a stroke simulator 30, and a reservoir 40. The hydraulic pressure generation unit A1 also includes selector valves 15, 16 (a "solenoid valve" in Claims), a normally closed solenoid valve 17, and pressure sensors 18, 19.

The base body 10 is a metallic part which is installed on the vehicle, and the parts described above are built on the base body 10.

Main hydraulic lines 10a, 10b, communication hydraulic lines 10c, 10d and a branch hydraulic line 10e are formed in an interior of the base body 10.

A control unit 50 is attached to an outer surface of the base body 10. The reservoir 40 is attached to an upper surface of the base body 10.

The master cylinder 20 converts pedal effort on the brake pedal P into brake hydraulic pressure.

The master cylinder 20 includes a primary piston 21 which is disposed on a bottom surface side of a primary cylinder bore 20a and a secondary piston 22 which is disposed on an opening side of the primary cylinder bore 20a. The master cylinder 20 further includes a primary elastic member 24 which is accommodated in a primary pressure chamber 20b defined between a bottom surface of the primary cylinder bore 20a and the primary piston 21 and a secondary elastic member 25 which is accommodated in a secondary pressure chamber 20c defined between both the pistons 21, 22. In this embodiment, both the elastic members 24, 25 are coil springs.

The secondary piston 22 is connected to the brake pedal P via a push rod P1. Both the pistons 21, 22 receive the pedal effort on the brake pedal P to thereby slide in the primary cylinder bore 20a, whereby brake fluid in both the pressure chambers 20b, 20c is pressurized.

The stroke simulator 30 generates a false operation reaction force to the brake pedal P. The stroke simulator 30 includes a primary piston 31 which slides in a secondary cylinder bore 30a and two elastic members 32, 33 which bias the piston 31 towards a bottom surface side of the secondary cylinder bore 30a. A pressure chamber 30b is defined between a bottom surface of the secondary cylinder bore 30a and the piston 31.

The pressure chamber 30b of the stroke simulator 30 communicates with the secondary pressure chamber 20c of the master cylinder 20 by way of the branch hydraulic line 10e and the second main hydraulic line 10b, which will be described later. The piston 31 is caused to move against the biasing force of the elastic members 32, 33 by a brake hydraulic pressure generated in the secondary pressure chamber 20c, whereby a false operation reaction force is applied to the brake pedal P.

The two main hydraulic lines 10a, 10b are hydraulic lines which originate from the master cylinder 20. Pipings Ha, Hb which reach the hydraulic pressure control unit A3 are connected to output ports 10*f*, 10*g* which constitute terminating points of both the main hydraulic lines 10*a*, 10*b*, respectively.

The first main hydraulic line 10*a* establishes a communication from the primary pressure chamber 20*b* of the master cylinder 20 to the output port 10*f*, which is one of the output ports 10*f*, 10*g*. The secondary main hydraulic line 10*b* establishes a communication from the secondary pressure chamber 20*c* of the master cylinder 20 to the other output port 10*g*.

The two communication hydraulic lines 10*c*, 10*d* are hydraulic lines which originate from inlet ports 10*h*, 10*i* to reach the main hydraulic lines 10*a*, 10*b*. Pipings Hc, Hd which reach the motor cylinder unit A2 are connected to the two inlet ports 10*u*, 10*i*, respectively.

The first communication hydraulic line 10*c* establishes a communication from the inlet port 10*h*, which is one of the inlet ports 10*h*, 10*i*, to the primary main hydraulic line 10*a*. The secondary communication hydraulic line 10*d* establishes a communication from the other inlet port 10*i* to the secondary main hydraulic line 10*b*.

The branch hydraulic line 10*e* is a hydraulic line which branches off from the secondary hydraulic line 10*b* to reach the pressure chamber 30*b* of the stroke simulator 30.

The first selector valve 15, which is a three-way valve, is provided at a connecting portion of the first main hydraulic line 10*a* with the first communication hydraulic line 10*c*.

The first valve 15 is a solenoid valve. When it is not energized (is in an initial state), the first selector valve 15 cuts off a communication between the first communication hydraulic line 10*c* and the first main hydraulic line 10*a*, while establishing a communication between an upstream side (a side ending up at the master cylinder 20) and a downstream side (ending up at the output port 10*f*) of the first main hydraulic line 10*a*.

Figure 2:
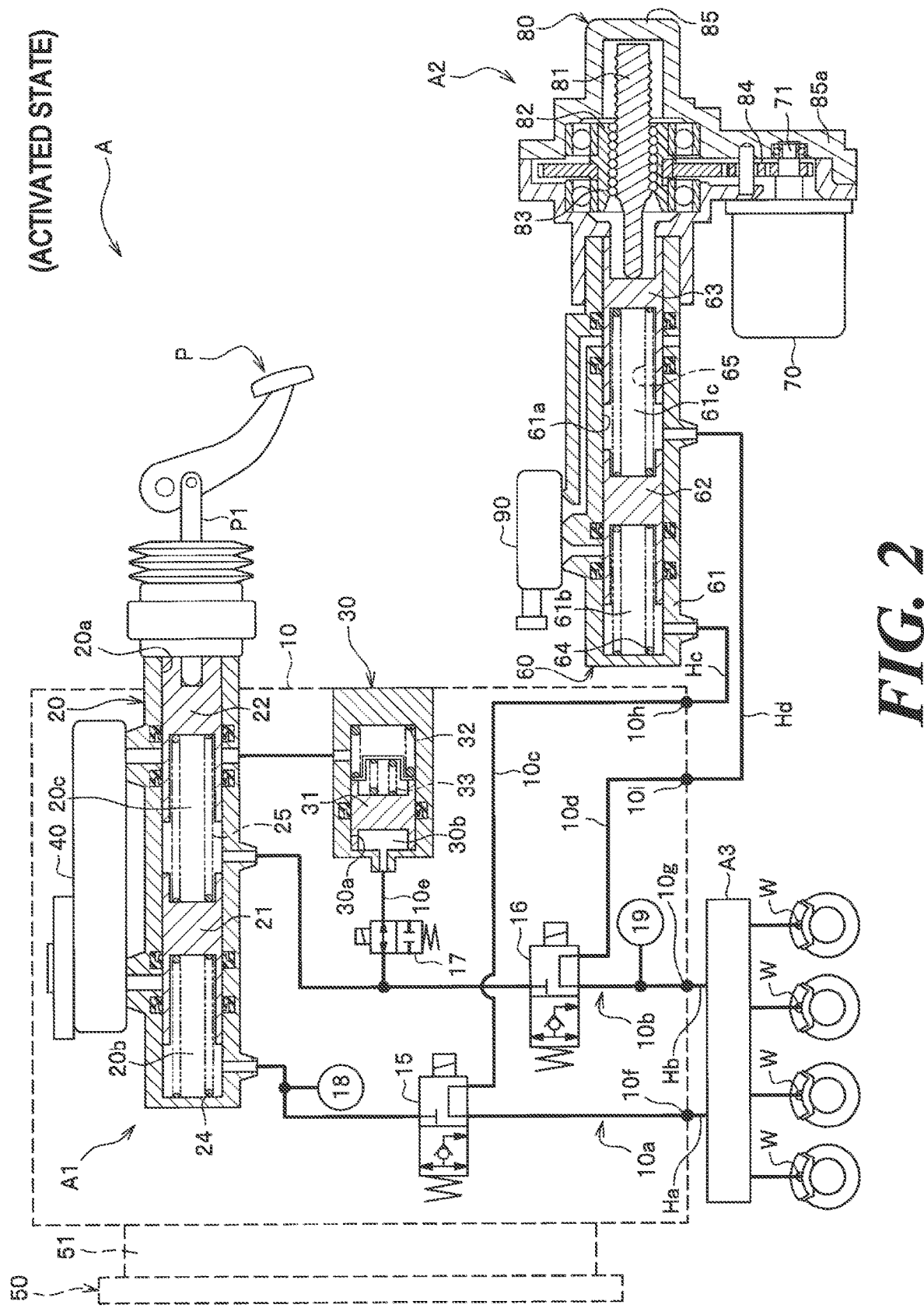
FIG. 2 is a schematic diagram showing the vehicle brake hydraulic pressure control apparatus according to the embodiment, which is active.

When it is energized, the first selector valve 15 establishes a communication between the first communication hydraulic line 10*c* and the first main hydraulic line 10*a* while cutting off a communication between the upstream side and the downstream side of the first main hydraulic line 10*a* (refer to FIG. 2).

The second selector valve 16, which is a three-way valve, is provided at a connecting portion of the second main hydraulic line 10*b* with the second communication hydraulic line 10*d*.

The selector valve 16 is a solenoid valve. When it is not energized (is in an initial state), the second selector valve 16 cuts off a communication between the second communication hydraulic line 10*d* and the second main hydraulic line 10*b*, while establishing a communication between an upstream side (a side ending up at the master cylinder 20) and a downstream side (ending up at the output port 10*g*) of the second main hydraulic line 10*b*.

When it is energized, the second selector valve 16 establishes a communication between the second communication hydraulic line 10*d* and the second main hydraulic line 10*b* while cutting off a communication between the upstream side and the downstream side of the second main hydraulic line 10*b* (refer to FIG. 2).

The normally closed solenoid valve 17 is provided on the branch hydraulic line 10*e*.

When it is not energized (is in an initial state), the normally closed solenoid valve 17 cuts off a communication between a side of the branch hydraulic line 10*e* which ends up at the secondary main hydraulic line 10*b* and a side thereof which ends up at the stroke simulator 30.

When it is energized, the normally closed solenoid valve 17 communicates the side of the branch hydraulic line 10*e* which ends up at the secondary main hydraulic line 10*b* and the side thereof which ends up at the stroke simulator 30 (refer to FIG. 2).

The pressure sensors 18, 19 detect a magnitude of brake hydraulic pressure, and pieces of information acquired at both the pressure sensors 18, 19 are outputted to the control unit 50.

The first pressure sensor 18 is mounted in a sensor mounting hole (not shown) which communicates with the first main hydraulic line 10*a*. The first pressure sensor 18 is disposed upstream of the first selector valve 15 and detects a magnitude of a brake hydraulic pressure generated in the master cylinder 20.

The second pressure sensor 19 is mounted in a sensor mounting hole (not shown) which communicates with the second main hydraulic line 10*b*. The second pressure sensor 19 is disposed downstream of the second selector valve 16. The second pressure sensor 19 detects a magnitude of a brake hydraulic pressure generated in the motor cylinder unit A2 in such a state that the second selector valve 16 is closed (in such a state that the upstream side of the second main hydraulic line 10*b* is disconnected from the downstream side thereof).

The control unit 50 has a resin housing 51, and a control circuit board (not shown) is accommodated in the housing 51.

The control unit 50 controls the driving of the motor 70, the switching of both the selector valves 15, 16 and the opening and closing of the normally closed solenoid valve 17 based on pieces of information obtained from the various sensors such as both the pressure sensors 18, 19 and stroke sensors (not shown) and programs stored in advance.

The motor cylinder unit A2 includes a tandem-type slave cylinder 60, the motor 70, a drive transmission portion 80 and a reservoir 90.

The slave cylinder 60 generates a brake hydraulic pressure corresponding to a brake hydraulic pressure generated in the master cylinder 20.

The slave cylinder 60 includes a base body 61 which is a cylindrical metallic part, a primary piston 62 which is disposed on a bottom surface side of a cylinder bore 61*a* in the base body 61 and a secondary piston 63 which is disposed on an opening side of the cylinder bore 61*a*. The slave cylinder 60 includes a primary elastic member 64 which is accommodated in a primary pressure chamber 61*b* which is defined between a bottom surface of the cylinder bore 61*a* and the primary piston 62 and a secondary elastic member 65 which is accommodated in a secondary pressure chamber 61*c* which is defined between both the pistons 62, 63. The reservoir 90 is attached to an upper surface of the base body 61.

The drive transmission portion 80 converts a rotational driving force of an output shaft 71 of the motor 70 into a straight-line axial force and is attached to an end portion of the base body 61.

The drive transmission portion 80 includes a rod 81, a cylindrical nut member 82 which is fitted on the rod 81, a ball screw mechanism 83 which is provided between the rod 81 and the nut member 82 and a gear mechanism 84 which transmits a rotational driving force of the motor 70 to the nut member 82. These parts described are accommodated in a housing 85. A distal end portion of the rod 81 is in abutment with the secondary piston 63.

The motor 70 is an electric servomotor which is driven and controlled by the control unit 50. The motor 70 is fixed to a motor fixing portion 85a which provided on an outer circumferential surface of the housing 85 so as to project therefrom. The output shaft 71 projects from the motor 70, and the output shaft 71 is inserted into an opening portion of the motor fixing portion 85a.

When a rotational driving force of the output shaft 71 is inputted into the nut member 82 by way of the gear mechanism 84, a straight-line axial force is applied to the rod 81, whereby the rod 81 moves back and forth in an axial direction.

When the rod 81 moves to the bottom surface side of the cylinder bore 61a, the secondary piston 63 receives an input from the rod 81 to thereby slide within the cylinder bore 61a, pressurizing the brake fluid in both the pressure chambers 61b, 61c.

Both the pressure chambers 61b, 61c of the slave cylinder 60 communicate with the inlet ports 10h, 10i of the hydraulic pressure generation unit A1 by way of the pipings Hc, Hd, respectively. A brake hydraulic pressure generated in the slave cylinder 60 is inputted into the hydraulic pressure generation unit A1 by way of the pipings Hc, Hd.

The hydraulic pressure control unit A3 is configured to execute various hydraulic controls such as an antilock brake control and a behavior stabilization control by controlling brake hydraulic pressures applied to wheel cylinders W of wheel brakes as required and is connected to the wheel cylinders W by way of pipings.

Although not shown, the hydraulic pressure control unit A3 includes a hydraulic unit where solenoid valves and a pump are provided, a motor for driving the pump and a control module for controlling the solenoid valves and the motor.

The hydraulic pressure control unit A3 communicates with the outlet ports 10f, 10g of the hydraulic pressure generation unit A1 by way of the pipings Ha, Hb, and a brake hydraulic pressure generated in the master cylinder 20 is inputted into the hydraulic pressure control unit A3 by way of the pipings Ha, Hb.

Next, the operation of the vehicle brake hydraulic pressure control apparatus A will briefly be described.

In the vehicle brake hydraulic pressure control apparatus A, when the system of the vehicle is activated, as shown in FIG. 2, the first selector valve 15 establishes a communication between the first communication hydraulic line 10c and the downstream side of the first main hydraulic line 10a while cutting off the communication between the upstream side and the downstream side of the first main hydraulic line 10a.

The second selector valve 16 establishes a communication between the second communication hydraulic line 10d and the downstream side of the second main hydraulic line 10b while cutting off the communication between the upstream side and the downstream side of the second main hydraulic line 10b.

The normally closed solenoid valve 17 is opened, so that the side of the branch hydraulic line 10e which ends up at the second main hydraulic line 10b communicates with the side thereof which ends up at the stroke simulator 30.

In this state, a brake hydraulic pressure generated in the master cylinder 20 by the operation of the brake pedal P is not transmitted to the wheel cylinders W but transmitted to the stroke simulator 30. Then, the brake hydraulic pressure in the pressure chamber 30b of the stroke simulator 30 is increased, whereby the piston 31 is caused to move against the biasing forces of the elastic members 32, 33, permitting the stoke of the brake pedal P. As this occurs, a false operation reaction force is applied to the brake pedal P by the piston 31 which is biased by the elastic members 32, 33.

When a depression of the brake pedal P is detected by a stroke sensor (not shown), the motor 70 of the motor cylinder unit A2 is driven, and the rod 81 moves towards the bottom surface side of the cylinder bore 61a. This moves the secondary piston 63 of the slave cylinder 60 towards the bottom surface side of the cylinder bore 61a, whereby the brake fluid in the pressure chambers 61b, 61c are pressurized.

In this way, the brake hydraulic pressure generated in the motor cylinder unit A2 is transmitted to the wheel cylinders W by way of the hydraulic pressure generation unit A1 and the hydraulic pressure control unit A3 to thereby activate the wheel cylinders W, braking force being thereby applied to the wheels.

In such a state that the motor cylinder unit A2 is not activated (for example, a case where no electric power is obtained), as shown in FIG. 1, the first selector valve 15 cuts off the communication between the first communication hydraulic line 10c and the first main hydraulic line 10a while establishing a communication between the upstream side and the downstream side of the first main hydraulic line 10a.

The second selector valve 16 cuts off the communication between the second communication hydraulic line 10d and the second main hydraulic line 10b while establishing a communication between the upstream side and the downstream side of the second main hydraulic line 10b. The normally closed solenoid valve 17 is closed.

In this state, a brake hydraulic pressure generated in the master cylinder 20 is transmitted to the wheel cylinders W.

Next, the configurations of the selector valves 15, 16 will be described in detail.

In this embodiment, as shown in FIG. 1, the first selector valve 15 and the second selector valve 16 have the same construction. Therefore, in the following description, only the first selector valve 15 will be described, and the description of the second selector valve 16 will be omitted.

In the following description, up-down and left-right directions are determined as a matter of convenience in describing the construction of the first selector valve 15, and hence, the construction of the first selector valve 15 and a state where the first selector valve 15 is built up are not limited at all by those directions.

The first selector valve 15 is a solenoid valve and a three-way valve of two positions and three ports. The first selector valve 15 is provided at the connecting portion of the first main hydraulic line 10a with the first communication hydraulic line 10c.

Figure 3:
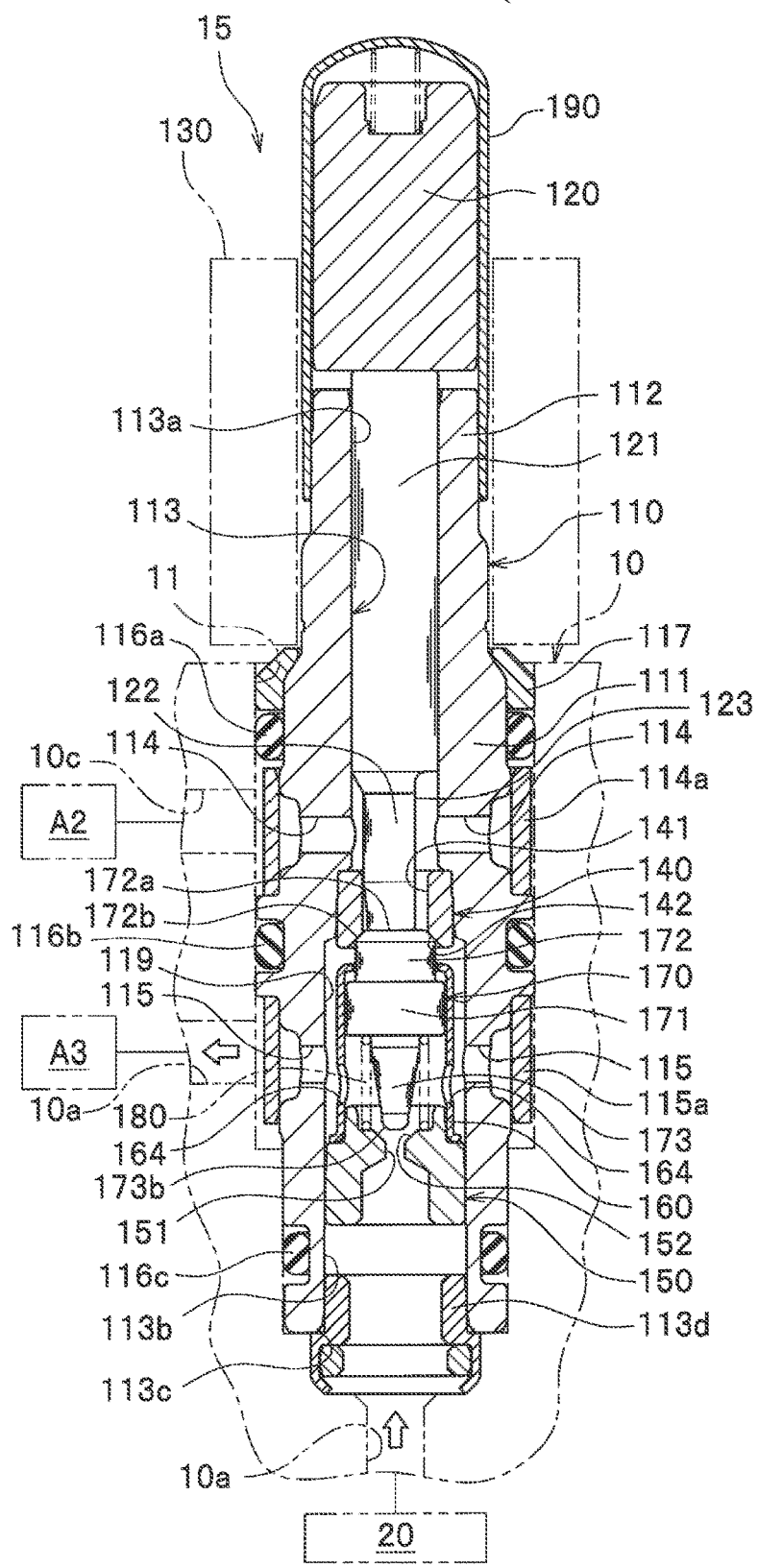
FIG. 3 is a sectional view showing a first selector valve according to the embodiment, which is not energized.

As shown in FIG. 3, the first selector valve 15 is inserted in a mounting hole 11 formed on one surface of the base body 10. The upstream side (the side which ends up at the master cylinder 20) of the first main hydraulic line 10a is opened to a bottom surface of the mounting hole 11. The downstream side (the side which ends up at the hydraulic pressure control unit A2) of the first main hydraulic line 10a is opened to an inner circumferential surface of the mounting hole 11. The first communication hydraulic line 10c is opened to the inner circumferential surface of the mounting hole 11 in a position lying above a downstream side opening portion of the first main hydraulic line 10a (the opening side of the mounting hole 11).

The first selector valve 15 includes a fixed core 110, a movable core 120 which is provided above the fixed core 110, and a coil 130 which is fitted on the movable core 120 and the fixed core 110.

A first valve seat member 140, a second valve seat member 150, a guide member 160, a valve body member 170 and a spring member 180 are accommodated in an interior of the fixed core 110. A cover member 190 is placed on the movable core 120 and the fixed core 110.

The fixed core 110 is a cylindrical member which is made of a magnetic material such as iron or iron alloy. Formed in the fixed core 110 are an inserted portion 111 which is inserted into the interior of the mounting hole 11 in the base body 10 and a projecting portion 112 which projects from the mounting hole 11. A center hole 113 having a circular cross section is formed in central portions of the inserted portion 111 and the projecting portion 112 so as to penetrate therethrough in an axial direction.

Formed in the central hole 113 are a small diameter hole portion 113a which is formed so as to extend from an upper end face of the projecting portion 112 to an upper portion of the inserted portion 111 and a large diameter hole portion 113b which is formed so as to extend from the upper portion of the inserted portion 111 to a lower end face thereof.

Plural first communication holes 114 are formed so as to penetrate a side wall of the upper portion of the inserted portion 111 in a radial direction. The small diameter hole portion 113a communicates with the first communication hydraulic line 10c through these first communication holes 114.

A cylindrical first filter 114a is fitted on an outer circumferential surface of the inserted portion 111 so as to cover opening portions of the first communication holes 114.

Plural second communication holes 115 are formed so as to penetrate a side wall of a lower portion of the inserted portion 111 so as to penetrate therethrough in the radial direction. The large diameter hole portion 113b communicates with the downstream side (the side which ends up at the hydraulic pressure control unit A3) of the first main hydraulic line 10a through these second communication holes 115.

A cylindrical second filter 115a is disposed on the outer circumferential surface of the inserted portion 111 so as to cover opening portions of the second communication holes 115.

An annular first seal member 116a is fitted on the outer circumferential surface of the inserted portion 111 in a position lying above the opening portions of the first communication holes 114.

An annular second seal member 116b is fitted on the outer circumferential surface of the inserted portion 111 in a position lying between the opening portions of the first communication holes 114 and the opening portions of the second communication holes 115.

A third seal member 116c is fitted on the outer circumferential surface of the inserted portion 111 in a position lying below the opening portions of the second communication holes 115.

The seal members 116a, 116b, 116c seal up a gap defined between the outer circumferential surface of the inserted portion 111 and the inner circumferential surface of the mounting hole 11 in a fluid-tight fashion.

An annular locking member 117 is fitted on the outer circumferential surface of the inserted portion 111 in a position corresponding to an opening portion of the mounting hole 11. The locking member 117 is fixed to the opening portion of the mounting hole 11 with a clip or the like to thereby prevent the dislocation of the fixed core 110 from the mounting hole 11.

An opening edge portion of the mounting hole 11 may be plastically deformed towards the fixed core 110 to thereby prevent the dislocation of the fixed core 110 from the mounting hole 11.

The first valve seat member 140 is a metallic cylindrical member. The first valve seat member 140 is press fitted in a lower end portion (an end portion facing the large diameter hole portion 13b) of the small diameter hole portion 113a.

A step portion in the small diameter hole portion 113a is in abutment with an outer circumferential edge portion of an upper end face of the first valve seat member 140. The first valve seat surface member 140 is disposed between the opening portions of the first communication holes 114 and the opening portions of the second communication holes 115 in the central hole 113.

Figures 6A, 6B:
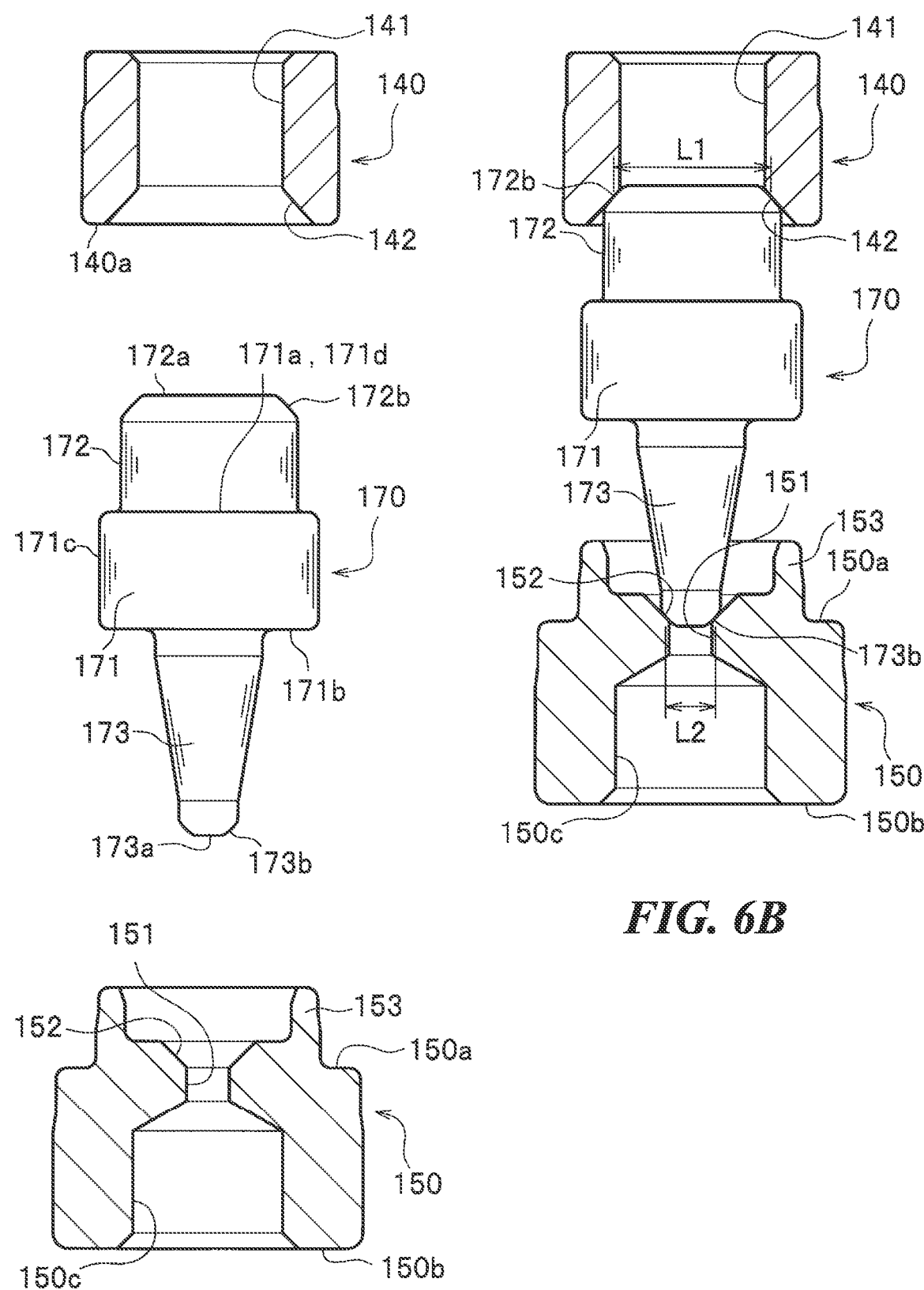
FIG. 6A is an exploded perspective view of a first valve seat member, a valve body member and a second valve seat member according to the embodiment.
FIG. 6B shows sealing diameters of a first valve portion and a second valve portion.

As shown in FIG. 6A, a flow path 141 having a circular cross section is formed so as to penetrate a central portion of the first valve seat member 140 in the axial direction.

A funnel-shaped (tapered) valve seat surface 142 is formed on an opening edge portion of the flow path 141 on a lower end face 140a of the first valve seat member 140. The valve seat surface 142 of the first valve seat member 140 is a portion on which a first valve portion 172 of the valve body member 170, which will be described later, is seated (refer to FIG. 3).

In this embodiment, an opening portion and the valve seat surface 142 of the flow path 141 are formed substantially on the whole of the lower end face 140a of the first valve seat member 140.

The second valve seat member 150 is a metallic cylindrical member. As shown in FIG. 3, the second valve seat member 115 is press fitted in a lower portion of the large diameter hole portion 113b. The second valve seat member 150 is disposed below the second communication holes 115 in the central hole 113.

A third filter 113d which is press fitted in a proximal opening portion 113c of the central hole 113 is provided below the second valve seat member 150.

As shown in FIG. 6A, a flow path 151 is formed so as to penetrate a central portion of the second valve seat member 150 in the axial direction. A recess portion 150c is formed in a central portion of a lower end face 150b of the second valve seat member 150. The flow path 151 is opened to a bottom portion of the recess portion 150c.

In this embodiment, a bore diameter of the flow path 151 of the second valve seat member 150 is formed smaller than a bore diameter of the flow path 141 of the first valve seat member 140.

A funnel-shaped (tapered) valve seat surface 152 is formed on an opening edge portion of the flow path 151 on an upper end face 150a of the second valve seat member 150. The valve seat surface 152 of the second valve seat member 150 is a portion on which a second valve portion 173 of the valve body member 170, which will be described later, is seated (refer to FIG. 4).

A cylindrical mounting portion 153 is provided on a circumference of the valve seat surface 152 on the upper end face 150a of the second valve seat member 150 so as to project therefrom. The flow path 151 is opened to a central portion of a bottom surface of the mounting portion 153.

Figure 5B:
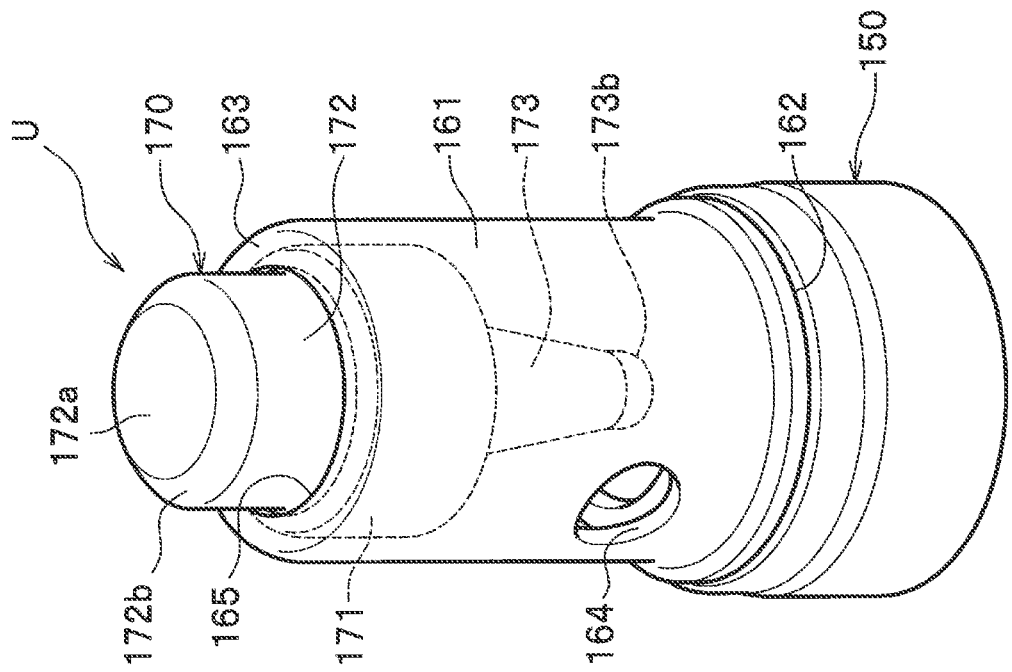
FIG. 5B is a perspective view thereof.

As shown in FIG. 5B, the guide member 160 is made up of a metallic cylindrical portion 161. An opening portion 162 is formed at a lower end portion of the cylindrical portion 161, and a distal wall portion 163 is formed at an upper end portion of the cylindrical portion 161.

Figure 5A:
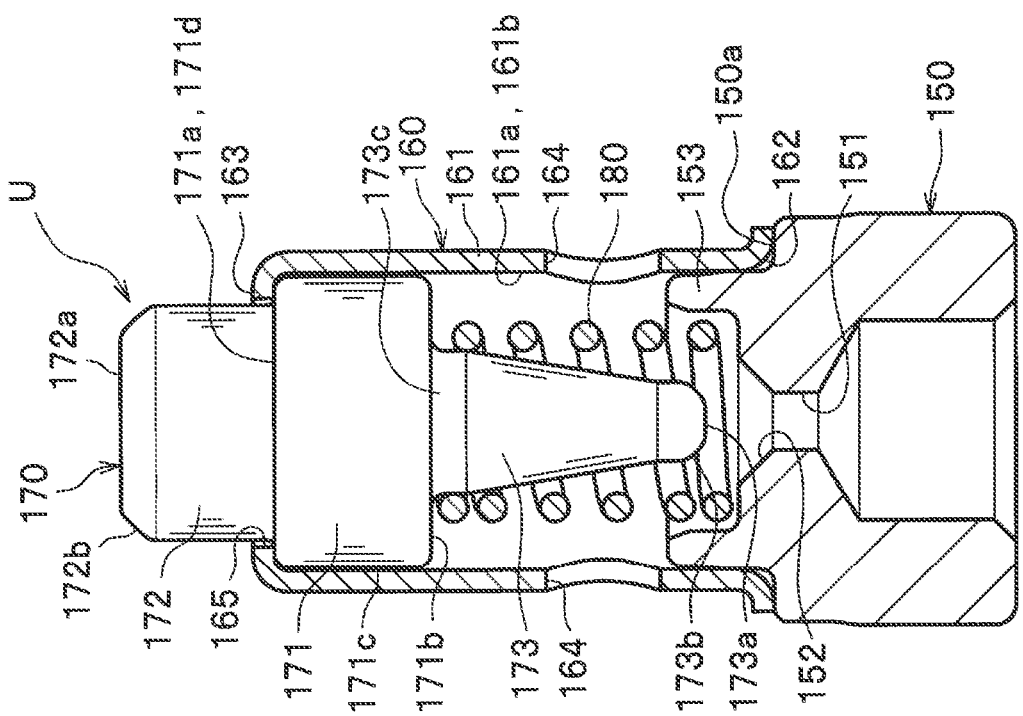
FIG. 5A is a sectional view of a valve body unit according to the embodiment.

As shown in FIG. 5A, the lower end portion of the cylindrical portion 161 is fitted on the mounting portion 153 of the second valve seat member 150.

The guide member 160 is fixed to the upper end face 150*a* of the second valve seat member 150. The guide member 160 restricts the valve body member 170 from moving away from the second valve seat member 150.

Plural third communication holes 164 are formed on a side wall of the cylindrical portion 161 so as to penetrate therethrough in the radial direction. As shown in FIG. 3, in such a state that the cylindrical portion 161 is mounted on the second valve seat member 150, the third communication holes 164 are disposed on an upper side of the mounting portion 153.

As shown in FIG. 5A, a circular insertion hole 165 is formed in a central portion of the distal wall portion 163 of the cylindrical portion 161 so as to penetrate therethrough in the axial direction (refer to FIG. 5B). The insertion hole 165 is a portion through which the first valve portion 172 of the valve body member 170, which will be described later, is inserted.

An inner circumferential surface 161*a* of the cylindrical portion 161 is a guide surface 161*b* on which a main body portion 171 of the valve body member 170, which will be described later, slides.

As shown in FIG. 3, a cylindrical flow path 119 is formed in a space defined between an outer circumferential surface of the cylindrical portion 161 of the guide member 160 and an inner circumference surface of the central hole 113 of the fixed core 110. The third communication holes 164 of the guide member 160 communicate with the second communication holes 115 of the fixed core 110 by the flow path 119.

The valve body member 170 is a metallic member and includes, as shown in FIG. 5A, the main body portion 171 which is accommodated within the guide member 160, the first valve portion 172 which is provided on an upper end face of the main body portion 171 so as to project therefrom and a second valve portion 173 which is provided on a lower end face of the main body portion 171 so as to project therefrom.

The main body portion 171, the first valve portion 172 and the second valve portion 173 of the valve body member 170 are formed so as to have a circular cross section (refer to FIG. 5B). The main body portion 171, the first valve portion 172 and the second valve portion 173 are formed on the same axis.

An outside diameter of the first valve portion 172 is formed smaller than an outside diameter of the main body portion 171, and an outside diameter of the second valve portion 173 is formed smaller than the outside diameter of the first valve portion 172.

As shown in FIG. 5A, the main body portion 171 is a portion which is accommodated in the guide member 160. The main body portion 171 can slide in an up-down direction in relation to the guide member 160. An outer circumferential surface of the main body portion 171 constitutes a sliding surface 171*c* which slides on the guide surface 161*b* which constitutes an inner surface of the guide member 160.

As shown in FIG. 6A, the first valve portion 172 is provided on an upper end face 171*a* of the main body portion 171 so as to project therefrom.

A distal end face 172*a* of the first valve portion 172 constitutes a flat surface (a flat plane) whose normal coincides with an axis of the valve body member 170. An abutment surface 172*b* having a rounded belt-like shape is formed at an outer circumferential edge portion of the distal end face 172*a* of the first valve portion 172. This abutment surface 172*b* constitutes a portion which is seated on the valve seat surface 142 of the first valve seat member 140.

As shown in FIG. 5A, the first valve portion 172 is inserted in the insertion hole 165 of the guide member 160 and projects upwards of the distal wall portion 163 of the guide member 160 (refer to FIG. 5B).

An outer circumferential edge portion of the upper end face 171*a* of the main body portion 171 constitutes an engagement portion 171*d* which is brought into abutment with an inner surface of the distal wall portion 163 of the guide member 160 when the valve body member 170 moves upwards.

As shown in FIG. 6A, the second valve portion 173 is provided on a central portion of a lower end face 171*b* of the main body portion 171 so as to project therefrom.

The second valve portion 173 is contracted in diameter as it extends from a proximal base portion (an upper end portion) to a distal end portion (a lower end portion). A maximum outside diameter of the second valve portion 173 is formed smaller than a maximum outside diameter of the first valve portion 172.

The base portion of the second valve portion 173 constitutes a spring bearing portion 173*c* on which an upper end portion of the spring member 180, which will be described later, is fitted, as shown in FIG. 5A.

An abutment surface 173*b* having a rounded belt-like shape is formed at an outer circumferential edge portion of a distal end face 173*a* of the second valve portion 173. The abutment surface 173*b* is formed by part of a spherical surface, and in this embodiment, the annular abutment surface 173*b* is formed by forming a top portion of a semi-spherical surface flat. This abutment surface 173*b* constitutes a portion which is seated on the valve seat surface 152 of the second valve seat member 150 when the valve body member 170 is moved downwards (refer to FIG. 4).

In the valve body member 170 of this embodiment, as shown in FIG. 6B, a seal diameter L1 of the first valve portion 172 is greater than a seal diameter L2 of the second valve portion 173. The seal diameters L1, L2 of the valve portions 172, 173 constitute outside diameters of areas where the abutment surfaces 172*b*, 173*b* of the valve portions 172, 173 are brought into contact with the valve seat surfaces 142, 152 of the valve seat members 140, 150 when the abutment surfaces 172*b*, 173*b* are seated on the valve seat surfaces 142, 152.

In the valve body member 170 of this embodiment, an area of the abutment surface 172*b* which is brought into abutment with the valve seat surface 142 of the first valve seat member 140 is greater than an area of the abutment surface 173*b* which is brought into abutment with the valve seat surface 152 of the second valve seat member 150.

Namely, a pressure bearing area where the first valve portion 172 bears a reaction force from the valve seat surface 142 when the first valve portion 172 is brought into abutment with the valve seat surface 142 of the first valve seat member 140 is greater than a pressure bearing area where the second valve portion 173 bears a reaction force from the valve seat surface 152 when the second valve 173 is brought into abutment with the valve seat surface 152 of the second valve seat member 150.

As shown in FIG. 5A, the spring member 180 is a coil spring. The spring member 180 is interposed between the second valve seat member 150 and the valve body member 170 in the guide member 160.

An upper end portion of the spring member 180 is fitted on the spring bearing portion 173*c* of the second valve portion 173, and is brought into abutment with the lower end face 171b of the main body portion 171.

A lower end portion of the spring member 180 is inserted in the mounting portion 153 of the second valve seat member 150 and is brought into abutment with a bottom surface of the mounting portion 153.

As shown in FIG. 3, the spring member 180 is interposed between the second valve seat member 150 and the valve body member 170 in a compressed state, whereby the valve body member 170 is pushed up in a direction in which the valve body member 170 moves away from the first valve seat member 150 by the biasing force of the spring member 180. As a result, the first valve portion 172 of the valve body member 170 is pressed against the valve seat surface 142 of the first valve seat member 140, whereby the flow path 141 in the first valve seat member 140 is closed.

In this embodiment, as shown in FIG. 5A, part of the valve body member 170 and the spring member 180 are accommodated in the guide member 160. Namely, the valve body member 170 and the spring member 180 are held on to the second valve seat member 150 by the guide member 160.

In this way, in this embodiment, the valve body member 170, the spring member 180, the guide member 160 and the second valve seat member 150 are configured as an integral unit.

Thus, in fabricating the first selector valve 15 (refer to FIG. 3), the valve body member 170, the spring member 180, the guide member 160 and the second valve seat member 150 can be handled as a single valve body unit U.

As shown in FIG. 3, the movable core 120 is formed of a magnetic material and has a circular cross section. The movable core 120 is disposed on an upper side of the projecting portion 112 of the fixed core 110.

A movable rod 121 having a circular cross section is inserted in the small diameter hole portion 113a of the fixed core 110. The movable rod 121 is a resin member. The movable rod 121 can slide in the up-down direction in relation to the small diameter hole portion 113a.

Plural axially extending grooves (not shown) are formed on an outer circumferential surface of the movable rod 121. For example, four grooves may be disposed at equal intervals in a circumferential direction of the movable rod 121.

An upper end portion of the movable rod 121 project upwards from the center hole 113 of the fixed core 110 and is brought into abutment with a lower end face of the movable core 120.

A lower portion 122 of the movable rod 121 is contracted in diameter, so that a space is defined between an outer circumferential surface of the lower portion 122 and the inner circumferential surface of the center hole 113. This space communicates with the first communication holes 114.

A lower end portion of the movable rod 121 is inserted in the flow path 141 of the first valve seat member 140. A lower end face of the movable rod 121 is brought into abutment with distal end face 172a of the first valve portion 172.

A communication groove 123 is formed on the outer circumferential surface of the lower portion 122 of the movable rod 121. The communication groove 123 extends in an axial direction of the movable rod 121. A space is defined between an inner surface of the communication groove 123 and the inner circumferential surface of the first valve seat member 140.

Figure 4:
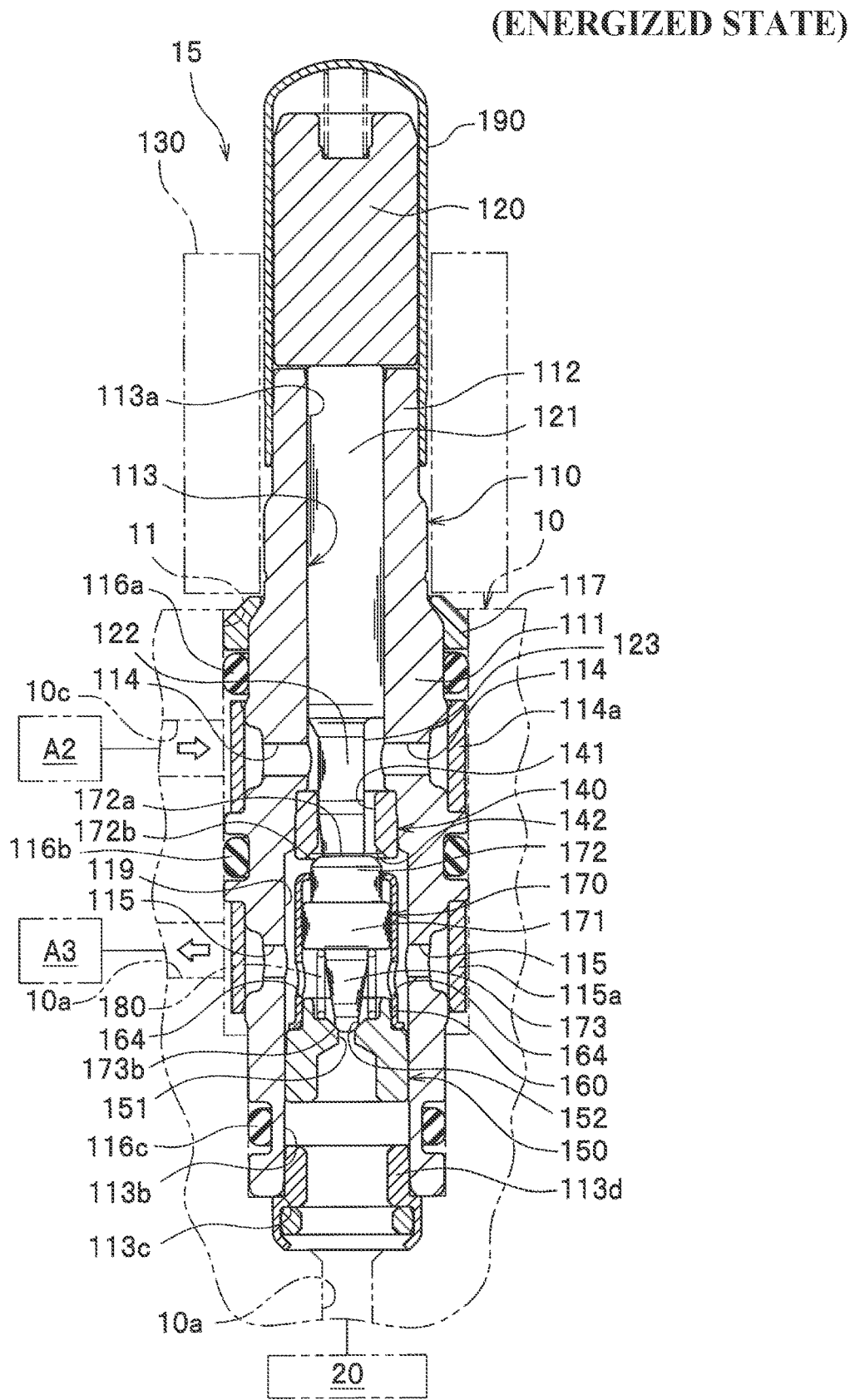
FIG. 4 is a sectional view showing the first selector valve according to the embodiment, which is energized.

As shown in FIG. 4, in such a state that the first valve portion 172 stay away from the valve seat surface 142 of the first valve seat member 40, a space defined above the first valve seat member 140 and a space defined therebelow communicate with each other through the communication groove 123.

The cover member 190 is a cylindrical member which is closed at an upper end portion thereof. The cover member 190 is placed over the movable core 120 and an upper end portion of the projecting portion 112 of the fixed core 110 and is welded to an outer circumferential surface of the projecting portion 112.

The coil 130 is an electromagnetic coil for moving the movable core 120 and is disposed on a circumference of the projecting portion 112 of the fixed core 110.

The coil 130 is energized by the control unit 50 (refer to FIG. 1) to thereby generates a magnetic field around the circumference of the projecting portion 112 of the fixed core 110.

In the first selector valve 15 of this embodiment, as shown in FIG. 3, the valve body member 170, the movable rod 121 and the movable core 120 are pushed upwards by the biasing force of the spring member 180 when the first selector valve 15 is not energized (in the initial state).

In this state, the second valve portion 173 stays away from the valve seat surface 152 of the second valve seat member 150, whereby the flow path 151 of the second valve seat member 150 is opened. The first valve portion 172 is seated on the valve seat surface 142 of the first valve seat member 140, whereby the flow path 141 of the first valve seat member 140 is closed.

Thus, in the first selector valve 15 which is not energized, the communication between the first communication hydraulic line 10c and the first main hydraulic line 10a is cut off while a communication between the upstream side (the side ending up at the master cylinder 20 and the downstream side (the side ending up at the hydraulic pressure control unit A3) of the first main hydraulic line 10a is established (refer to FIG. 1).

When the first selector valve 15 of this embodiment is energized, the coil 130 is energized and is then magnetically excited. This magnetically excites the fixed core 110, and as shown in FIG. 4, the movable core 120 is drawn towards the fixed core 110. Then, the movable core 120, the movable rod 121 and the valve body member 170 are moved downwards against the biasing force of the spring member 180.

In this state, the second valve portion 173 is seated on the valve seat surface 152 of the second valve seat member 150, whereby the flow path 151 of the second valve seat member 150 is closed. In addition, the first valve portion 172 is caused to move away from the valve seat surface 142 of the first valve seat member 140, whereby the flow path 141 of the first valve seat member 140 is opened.

Thus, in the first selector valve 15 which is energized, a communication is established between the first communication hydraulic line 10c and the downstream side of the first main hydraulic line 10a while the communication between the upstream side and the downstream side of the first main hydraulic line 10a is cut off (refer to FIG. 2).

Next, in a fabrication method of the first selector valve 15 of the embodiment, a process of building the valve body member 170 and the second valve seat member 150 into the fixed core 110 will be described.

Figure 7:
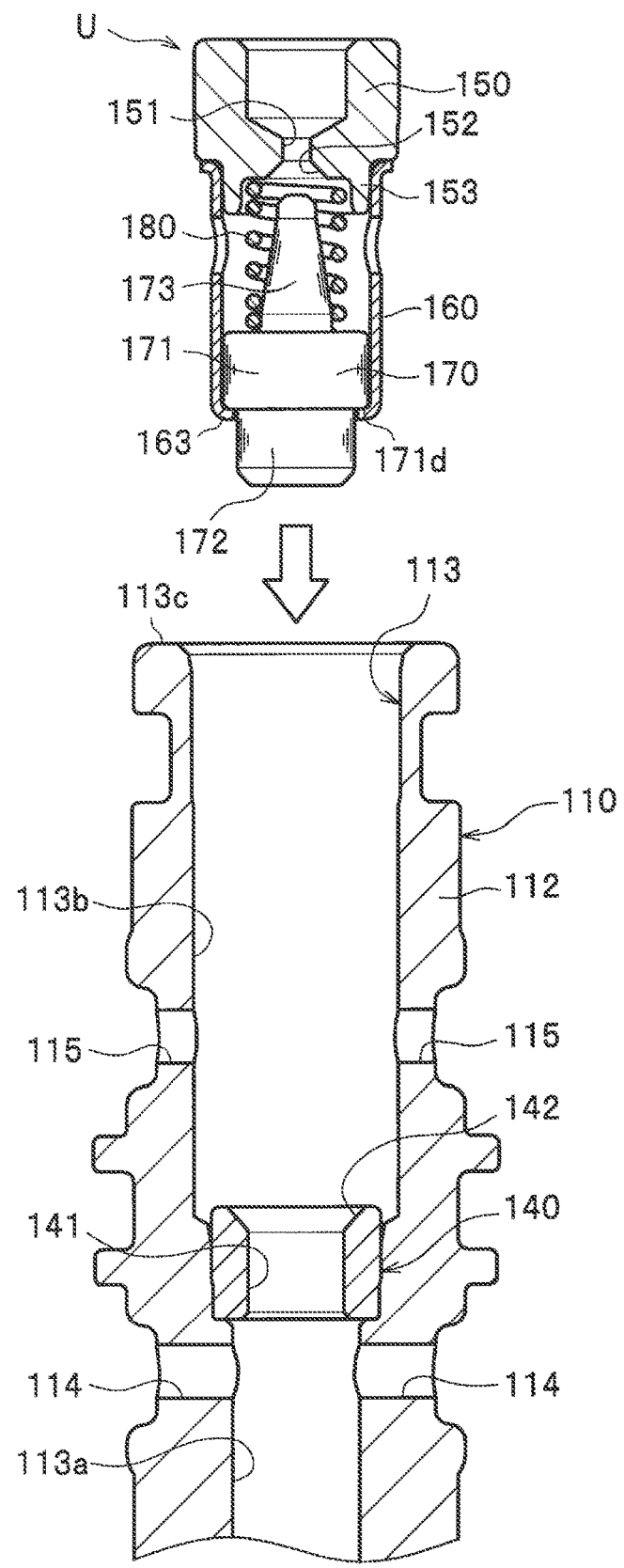
FIG. 7 is a perspective view showing a step of building the valve body unit into an interior of a fixed core in a first selector valve fabrication method according to the embodiment.

In the fabrication method of the embodiment, as shown in FIG. 7, the fixed core 110 is prepared, and the fixed core 110 is disposed so that the proximal opening portion 113c is opened upwards. The first valve seat member 140 is press fitted in the center hole 113, and the first valve seat member 140 is fixed in a predetermined position in the fixed core 110.

On the other hand, the valve body member 170 and the spring member 180 are held in the second valve seat member 150 using the guide member 160, so that the valve body unit U is formed in advance.

After the first valve seat member 140 is fixed in the fixed core 110, the valve body unit U is inserted into the center hole 113, and the second valve seat member 150 is press fitted in the center hole 113.

As this occurs, since the valve body member 170 is inserted into the center hole 113 from an end where the guide member 160 is provided, the valve body member 170 and the spring member 180 are disposed below the second valve seat member 150. In this state, since the engagement portion 171d of the valve body member 170 is brought into engagement with the distal wall portion 163 of the guide member 160, the state where the valve body member 170 and the spring member 180 are held within the guide member 160 can be maintained.

A shown in FIG. 3, by fixing the second valve seat member 150 in the predetermined position in the center hole 113, the valve body member 170 can be disposed in the predetermined position in the center hole 113, whereby the first valve portion 172 of the valve body member 170 is seated on the valve seat surface 142 of the first valve seat member 140.

In the first selector valve 15 as described above, as shown in FIG. 5A, the valve body member 170, the spring member 180, the guide member 160 and the second valve seat member 150 are configured as the integral unit. Thus, in fabricating the first selector valve 15, as shown in FIG. 7, the valve body member 170, the spring member 180, the guide member 160 and the second valve seat member 150 can be built into the fixed core 110 as the single valve body unit U.

With the first selector valve 15 of this embodiment (refer to FIG. 3), the parts building performance can be improved, and hence, the productivity of such first selector valves 15 can be improved.

Since the spring bearing portion 173c on which the end portion of the spring member 180 is fitted on, the sliding surface 171c which can slide over the guide member 160 and the engagement portion 171d which is brought into engagement with the guide member 160 are formed on the valve body member 170, the parts which make up the valve body unit U can easily be built into the valve body unit U.

In the first selector valve 15, as shown in FIG. 3, since neither a retainer nor a spring member is required to be fitted on the first valve seat member 140, a sufficient radial size of the first valve seat member 140 can be ensured.

In the first selector valve 15, since the shapes of the two valve portions 172, 173 can be formed independently of each other, the shapes of the valve seat members 140, 150 are not limited by the shape of the valve body member 10.

Thus, with the first selector valve 15, the degree of freedom in relation to the shapes of the valve seat surface 142 and the flow path 141 of the first valve seat member 140 can be enhanced.

According to the embodiment, an axial cross-sectional area of the flow path 141 of the first valve seat member 140 can be made greater than an axial cross-sectional area of the flow path 151 of the second valve seat member 150 by making the seal diameter L1 of the first valve portion 172 greater than the seal diameter L2 of the second valve portion 173 (refer to FIG. 6B), thereby making it possible to increase a flow rate of brake fluid which passes the first valve seat member 140.

By making the seal diameter L1 of the first valve portion 172 so greater (refer to FIG. 6B), an area where the first valve portion 172 is brought into abutment with the valve seat surface 142 can be made greater than an area where the second valve portion 173 is brought into abutment with the valve seat surface 152, thereby making it possible to enhance the sealing performance of the first valve portion 172 against the first valve seat member 140 while increasing the flow rate of brake fluid which passes the first valve member 140.

As in this embodiment, by making the seal diameter L1 of the first valve portion 172 so greater (refer to FIG. 6B), an open angle of the valve seat surface 142 of the first valve seat member 140 can be increased, and hence, the first valve seat portion 172 can be seated stably on the valve seat surface 142 of the first valve seat member 140.

As shown in FIG. 6A, by forming the abutment surface 173b of the second valve portion 173 so as to constitute part of the spherical surface, the second valve portion 173 can be seated stably on the valve seat surface 152 of the second valve seat member 150.

In the first selector valve 15, as shown in FIG. 5A, since the valve body member 170 slides on the inner circumferential surface 161a (the guide surface 161b) of the guide member 160, the valve body member 170 is allowed to slide stably.

In the first selector valve 15, as shown in FIG. 3, since the lower end face of the movable rod 121 which moves in association with the movable core 120 is in abutment with the flat distal end face 172a of the first valve portion 172, the movable rod 121 is allowed to be brought into abutment with the first valve portion 172 in a stable fashion.

Since it becomes difficult for the movable rod 121 to wear as a result of the movable rod 121 being brought into surface contact with the first valve portion 172, the degree of freedom in selecting materials for the movable rod 121 can be enhanced, and hence, the fabrication cost of the movable rod 121 can be reduced.

In the first selector 15, the flow path 119 is defined between the inner circumferential surface of the center hole 113 and the outer circumferential surface of the guide member 160. Thus, as shown in FIG. 4, when the brake fluid flows from the first communication holes 114 to the second communication holes 115, the brake fluid passes through the flow path 119 situated on an outer side of the guide member 160, whereby it is possible to prevent a great amount of brake fluid from striking the spring member 180.

As a result, the degree of freedom in designing the spring member 180 can be enhanced. Since the spring member 180 does not have to be given a rigidity which is greater than required to support the valve body member 170, the spring member 180 can be made smaller in size.

Since the biasing force of the sprig member 180 can be suppressed, the electric power of the coil spring 130 which is required to move the movable core 120 against the biasing force of the spring member 180 can be reduced.

According to the vehicle brake hydraulic pressure control apparatus A of this embodiment, as shown in FIG. 1, since the selector valves 15, 16 described above are used, the productivity of the vehicle brake hydraulic pressure control apparatus A can be improved.

According to the vehicle brake hydraulic pressure control apparatus A of this embodiment, since not only can the selector valves 15, 16 be opened and closed in a stable fashion, but also the flow rate of brake fluid which passes the selector valves 15, 16 can be ensured sufficiently, it is possible to control well the brakes of the vehicle.

According to the fabrication method of the selector valve 15 of this embodiment, as shown in FIG. 7, since the valve body member 170, the spring member 180, the guide member 160 and the second valve seat member 150 are built into the fixed core 110 as the single valve body unit U, the productivity of the first selector valve 15 can be improved.

Thus, while the embodiment has been described heretofore, the invention is not limited by the embodiment but can be modified as required without departing from the spirit and scope thereof.

In this embodiment, as shown in FIG. 5B, while the guide member 160 has the cylindrical shape, the shape of the guide member is not limited thereto.

For example, the guide member may be made up of a proximal end portion which is attached to the second valve seat member 150, a distal end portion which is brought into engagement with the valve body member 170 and a connecting member which connects the proximal end portion and the distal end portion together, and the valve body member 170 and the spring member 180 may be accommodated between the proximal end portion and the distal end portion.

In the first selector valve 15 of this embodiment, as shown in FIG. 3, the first valve seat member 140 and the first valve portion 172 are disposed on the side of the first communication hydraulic line 10c, and the second valve seat member 150 and the second valve portion 173 are disposed on the upstream side of the first main hydraulic line 10a. However, the second valve seat member 150 and the second valve portion 173 may be disposed on the side of the first communication hydraulic line 10c, and the first valve seat member 140 and the first valve portion 172 may be disposed on the upstream side of the first main hydraulic pressure line 10a.

In the first selector valve 15 of this embodiment, as shown in FIG. 6B, the seal diameter L1 of the first valve portion 172 is set greater than the seal diameter L2 of the second valve portion 173. However, the seal diameter L2 of the second valve portion 173 can be set greater than the seal diameter L1 of the first valve portion 172. In this way, in the solenoid valve of the embodiment, the seal diameter L1 of the first valve portion 172 is configured so as to differ from the seal diameter L2 of the second valve portion 173.

In the first selector valve 15 of this embodiment, as shown in FIG. 3, the movable core 120 and the movable rod 121 are configured as the separate members. However, the movable core 120 and the movable rod 121 may be formed as an integral unit.

As shown in FIG. 1, the solenoid valve of the embodiment is applied to the selector valves 15, 16 of the vehicle brake hydraulic pressure control apparatus A. However, the solenoid valve of the embodiment can also be applied to various types of hydraulic pressure control apparatuses.

The invention claimed is:

1. A solenoid valve comprising:
a fixed core in which a flow path is formed;
a movable core which is provided movably in relation to the fixed core;
a coil configured to move the movable core by an electromagnetic force;
a first valve seat member and a second valve seat member which are fixed in the fixed core;
a valve body member which is disposed between the first valve seat member and the second valve seat member; and
a spring member which is interposed between the valve body member and the second valve seat member,
wherein the valve body member is seated on a valve seat surface of the first valve seat member by a biasing force of the spring member,
wherein, as a result of the valve body member being pushed out by the movable core, the valve body member is caused to move away from the first valve seat member and to be seated on a valve seat surface of the second valve seat member, and
wherein the valve body member and the spring member are held to the second valve seat member by a guide member and movement of the valve body member away from second valve seat member is prevented by contact between a first valve portion of the valve body member and first valve seat member.

2. The solenoid valve of claim 1,
wherein a guide surface on which the valve body member can slide is formed on the guide member.

3. The solenoid valve of claim 1,
wherein the valve body member comprises:
a spring bearing portion on which an end portion of the spring member is fitted;
a sliding surface which can slide on the guide member; and
an engagement portion which is brought into engagement with the guide member.

4. The solenoid valve of claim 1,
wherein the valve body member comprises:
a first valve portion which is seated on the valve seat surface of the first valve seat member; and
a second valve portion which is seated on the valve seat surface of the second valve seat member,
wherein an area where the first valve portion is brought into abutment with the valve seat surface of the first valve seat member is greater than an area where the second valve portion is brought into abutment with the valve seat surface of the second valve seat member.

5. The solenoid valve of claim 4, further comprising:
a movable rod which moves in association with the movable core,
wherein a flat surface is formed on the first valve portion, and
wherein an end face of the movable rod is brought into abutment with the flat surface.

6. The solenoid valve of claim 4,
wherein the valve body member comprises:
a main body portion;
the first valve portion which is formed at one end of the main body portion; and
the second valve portion which is provided at the other end of the main body portion so as to project therefrom, and
wherein a part of a spherical surface is formed at a distal end portion of the second valve portion.

7. The solenoid valve of claim 1,
wherein the guide member has a cylindrical shape,
wherein the spring member is accommodated in the guide member, and
wherein a part of the flow path is formed between an inner circumferential surface of the fixed core and an outer circumferential surface of the guide member.

8. A vehicle brake hydraulic pressure control apparatus disposed between a master cylinder and a wheel cylinder, comprising:
a slave cylinder configured to generate a brake hydraulic pressure by driving an electric actuator; and
the solenoid valve of claim 1,
wherein the solenoid valve switches between:
a state where the valve body member is seated on the valve seat surface of the first valve seat member to thereby establish a communication between the master cylinder and the wheel cylinder; and a state where the valve body member is seated on the valve seat surface of the second valve seat member to thereby establish a communication between the slave cylinder and the wheel cylinder.

9. A fabrication method for the solenoid valve of claim 1, comprising:
fixing the first valve seat member in the fixed core; and
in such a state that the valve body member and the spring member are held to the second valve seat member by the guide member, fixing the second valve seat member in the fixed core and causing the valve body member to be seated on the valve seat surface of the first valve seat member.

10. The solenoid valve of claim 1, wherein the guide member, the valve body member, the second valve seat member, and the spring member are a unit that maintains the spring member in a compressed state independent of any contact between the valve body member and the first valve seat member.

11. The solenoid valve of claim 1, wherein the valve body member and the spring member are held in the second valve seat member by the guide member to form a single body unit, prior to assembly with the fixed core, the movable core, the coil and the first valve seat member.

12. The solenoid valve of claim 1,
wherein the guide member comprises:
a cylindrical portion,
an opening portion at a lower end portion of the cylindrical portion,
an opening portion at an upper end portion of the cylindrical portion,
an inwardly extending distal wall portion at the upper end portion of the cylindrical portion, and
an outwardly extending wall portion at the lower end portion,
wherein the outwardly extending wall portion at the lower end portion of the cylindrical portion is fitted on a mounting portion at an upper end face of the second valve seat member, and
the inwardly extending distal wall portion at the upper end portion of the cylindrical portion engages with a larger diameter upper end face of the valve body member.

13. The solenoid valve of claim 1, wherein the solenoid valve is a two position, three way valve.

14. A solenoid valve comprising:
a fixed core in which a flow path is formed;
a movable core which is provided movably in relation to the fixed core;
a coil configured to move the movable core by an electromagnetic force;
a first valve seat member and a second valve seat member which are fixed in the fixed core;
a valve body member which is disposed between the first valve seat member and the second valve seat member; and
a spring member which is interposed between the valve body member and the second valve seat member,
wherein the valve body member comprises:
a main body portion;
a first valve portion which is provided at one end face of the main body portion so as to project therefrom; and
a second valve portion which is provided at the other end face of the main body portion so as to project therefrom, wherein the first valve portion is seated on a valve seat surface of the first valve seat member by a biasing force of the spring member,
wherein, as a result of the valve body member being pushed out by the movable core, the first valve portion is caused to move away from the first valve seat member, and the second valve portion is then seated on a valve seat surface of the second valve seat member,
wherein a seal diameter of the first valve portion and a seal diameter of the second valve portion differ from each other, and
wherein a guide member is fixed to the second valve seat member and the valve body member and the spring member are moveable within a space defined by the second valve seat member the guide member.

15. The solenoid valve of claim 14,
wherein a sliding surface which can slide on a guide surface formed in the fixed core is formed on an outer circumferential surface of the main body portion.

16. The solenoid valve of claim 15,
wherein a guide surface on which the sliding surface of the main body portion can slide is formed on the guide member.

17. The solenoid valve of claim 14,
wherein the valve body member comprises:
a spring bearing portion on which an end portion of the spring member is fitted; and
an engagement portion which is brought into engagement with the guide member.

18. The solenoid valve of claim 14, further comprising:
a movable rod which moves in association with the movable core,
wherein a flat surface is formed on the first valve portion, and
wherein an end face of the movable rod is brought into abutment with the flat surface.

19. A vehicle brake hydraulic pressure control apparatus which is disposed between a master cylinder and a wheel cylinder, comprising:
a slave cylinder configured to generate a brake hydraulic pressure by driving an electric actuator; and
the solenoid valve of claim 14,
wherein the solenoid valve switches between:
a state where the valve body member is seated on the valve seat surface of the first valve seat member to thereby establish a communication between the master cylinder and the wheel cylinder; and
a state where the valve body member is seated on the valve seat surface of the second valve seat member to thereby establish a communication between the slave cylinder and the wheel cylinder.

20. The vehicle brake hydraulic pressure control apparatus of claim 19,
wherein the seal diameter of the first valve portion is greater than the seal diameter of the second valve portion.

21. The solenoid valve of claim 14, wherein the guide member, the valve body member, the second valve seat member, and the spring member are a unit that maintains the spring member in a compressed state independent of any contact between the valve body member and the first valve seat member.

22. The solenoid valve of claim 14,
wherein the guide member comprises:
a cylindrical portion,
an opening portion at a lower end portion of the cylindrical portion, an opening portion at an upper end portion of the cylindrical portion, an inwardly extending distal wall portion at the upper end portion of the cylindrical portion, and an outwardly extending wall portion at the lower end portion, wherein the outwardly extending wall portion at the lower end portion of the cylindrical portion is fitted on a mounting portion at an upper end face of the second valve seat member, and the inwardly extending distal wall portion at the upper end portion of the cylindrical portion engages with a larger diameter upper end face of the valve body member.

\* \* \* \* \*